May 1, 1956  G. H. GARRAWAY  2,743,901
FLUID TURBINE
Filed Feb. 11, 1950  3 Sheets-Sheet 1

INVENTOR.
GEORGE H. GARRAWAY
Godfrey B. Spen
ATTORNEY.

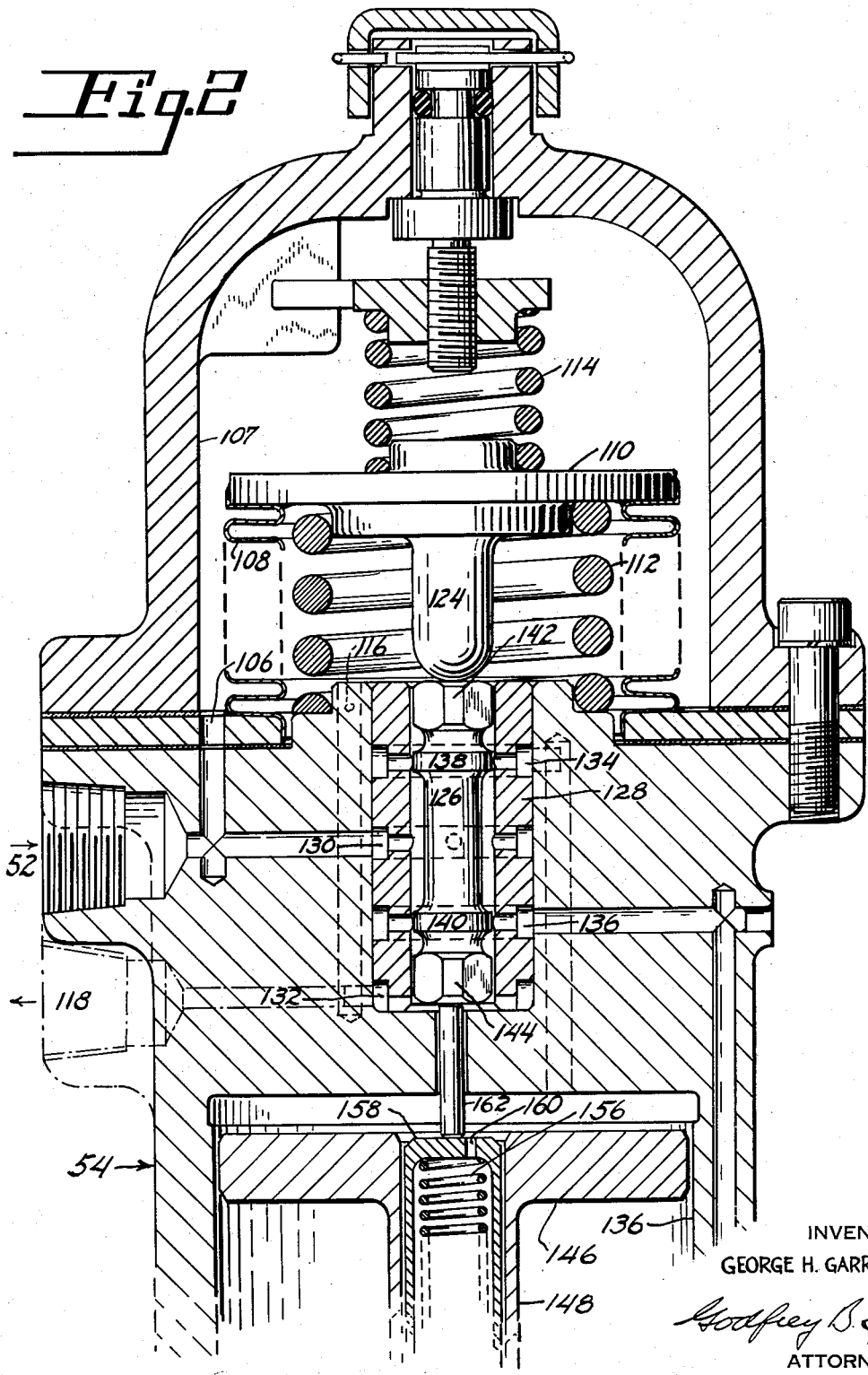

May 1, 1956 G. H. GARRAWAY 2,743,901
FLUID TURBINE

Filed Feb. 11, 1950 3 Sheets-Sheet 3

INVENTOR.
GEORGE H. GARRAWAY

ATTORNEY.

United States Patent Office 2,743,901
Patented May 1, 1956

2,743,901

FLUID TURBINE

George H. Garraway, Reading, Pa.

Application February 11, 1950, Serial No. 143,783

4 Claims. (Cl. 253—52)

This invention relates to turbine power plants of the type wherein elastic fluid medium such as steam or compressed gas is used for propulsion. In particular, the invention is concerned with small unitary turbine power plants having shaft power outputs from about 1 to 30 or 40 H. P., the unit having within itself the essential control system to maintain constant speed under varying load, and an automatic lubricating system which will allow the unit to operate for long periods of time without attention.

In general, the turbine unit of this invention includes turbine wheels of the impulse type adapted to be driven by steam or the like, special provisions being incorporated so that each nozzle system of the turbine produces a plurality of fluid impingements on the turbine blades. One or more such nozzle systems may be used. The unit further includes an automatic governing system which preferably is adjusted to maintain substantially constant speed by throttle regulation of the input fluid to the turbine to maintain speed regulation within narrow limits over a wide range of load on the turbine shaft. The unit is further provided with an overspeed shutoff mechanism subject to manual reset. Also, the unit is provided with a lubricating system, containing a sufficient supply of lubricant for long periods of operation and incorporating provisions for circulating the lubricant to the turbine bearings. The lubricating system further includes lubricant supply to the governor unit for speed regulation of the turbine.

It is known that self-contained turbine power plants have been designed and produced. Previous small turbines have fallen into two categories—either highly developed mechanisms with all the necessary safety provisions, which are very expensive, or, comparatively cheap turbine units whose governing features, safety provisions, speed regulation and other characteristics are unsatisfactory and erratic. Both types of these units are likely to be position sensitive unless special added features are incorporated therein and are very apt to operate at relatively low thermal efficiency due to the smallness of the units.

The present turbine design has for one object the provision of a turbine unit which is not position sensitive and which will have high efficiency over a wide range of operation. A further object of the invention is to provide a self-contained turbine unit, capable of operation with a variety of different working fluids, which is adaptable to standardized design and for direct attachment thereto of appropriate driven units such as pumps, compressors and the like. A further object of the invention is to provide a compact turbine power unit which may be used in industrial establishments where a working fluid is available, to replace electric motors or other types of power units. In this connection, in establishments where working fluid is available, electric motors are frequently used for auxiliary power requirements due to the lack of an appropriate turbine power plant which is sufficiently dependable and reasonable in price. The unit of this invention is adaptable for a large variety of applications including industrial, automotive, land, vehicle or even aircraft.

Further objects of the invention will become apparent in reading the annexed detailed description in connection with the drawings, in which similar reference characters indicate similar parts and in which Fig. 1 is a longitudinal section through the turbine unit of the invention;

Fig. 2 is a longitudinal section through a portion of the governor mechanism shown in its entirety in Fig. 1;

Figure 1:
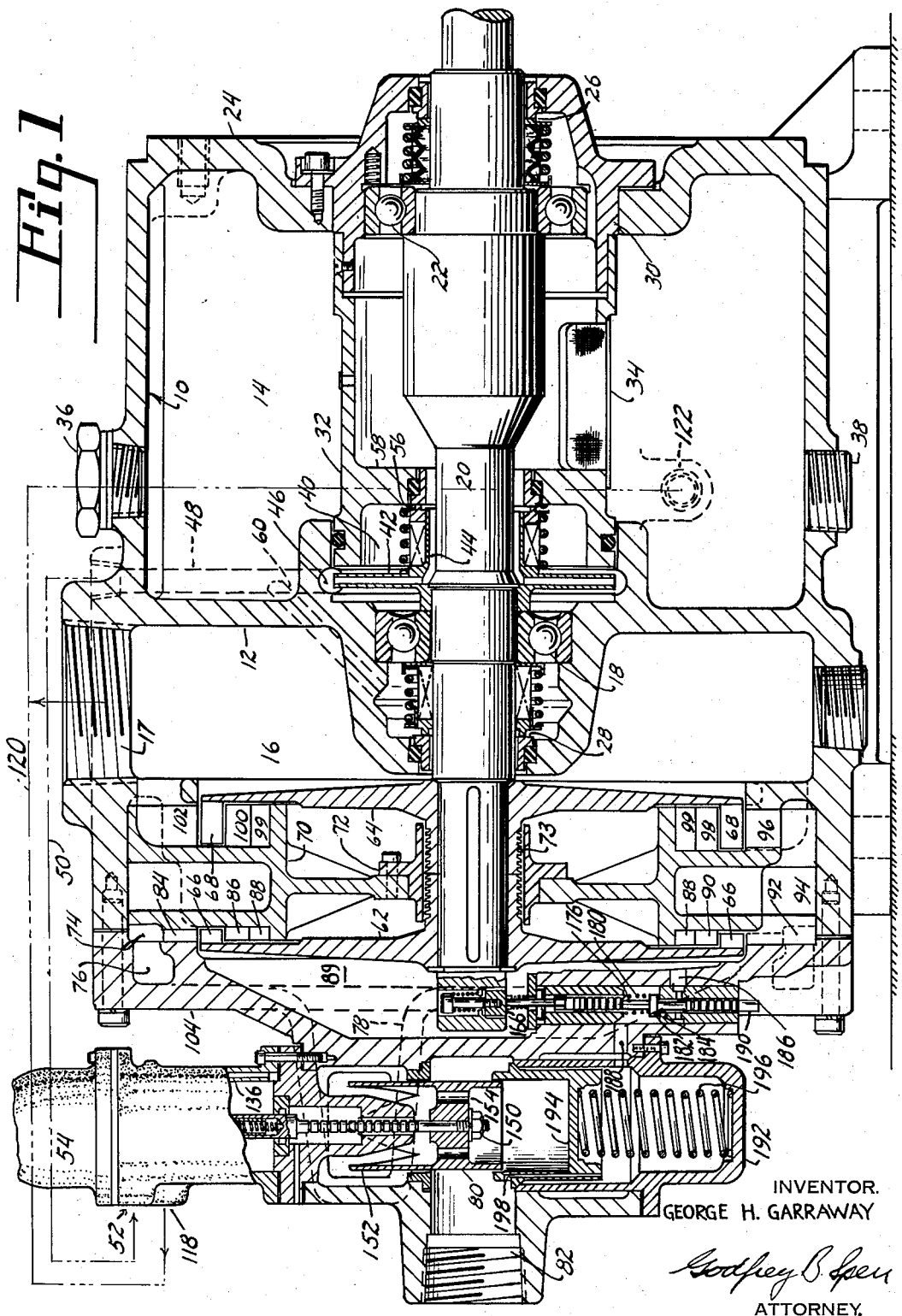

Reference may now be made to Fig. 1 in which a housing 10 is divided by a partition 12 into an oil reservoir 14 and a turbine chamber 16 part of which is vented to exhaust at 17. The partition 12 carries a bearing 18 supporting a power shaft 20, a right hand end portion of which is supported in a bearing 22 carried in an end wall 24 of the housing 10. Face seal assemblies 26 and 28 are arranged between the bearings 22 and 18 and the ends of respective housings to prevent oil leakage from the oil compartment 14, these seals being spring pressed into sealing engagement and embodying elastic diaphragm elements in a manner which is well known in the art. The right hand end of the shaft 20 protrudes as shown from the housing end 24 for power delivery purposes.

For construction facility, the bearing 22 is carried by an adapter 30 secured in the wall 24, said adapter having secured thereto a pump housing 32 which incorporates an oil filter screen 34. The oil compartment 14 may be filled with lubricant at a filler plug 36 and drainage of the sump may be accomplished at a drain plug 38. Between the oil pump housing 32 and the housing partition 12 is a cavity 40 occupied by a pump impeller 42 mounted on and driven by the shaft 20. This impeller receives oil through an annular channel 44 between the impeller hub and the shaft, and from the space within the housing 32, fed through the oil screen 34. As the shaft 20 rotates, the impeller 42 will build up a lubricant pressure in the outer margin of the cavity 40, as at 46, proportional to the rotational speed of the shaft. Fluid at this pressure is carried from the rim 46 through a pressure conduit 48, an external pipe 50 and an inlet 52 to the governor mechanism 54 later to be described. For lubrication of the bearing 18, lubricant is bled from the pressure conduit 48 through a conduit 60 on the outboard side of the bearing 18, the lubricant flowing rightwardly through the bearing to the impeller cavity. Lubricant at sump pressure floods the bearing 22 and the seal 26. An additional face seal 56 is provided on the pump impeller hub, engaging a seal ring in a wall 58 forming part of the pump housing 32 and isolating the high pressure oil cavity 40 from sump pressure.

Figure 4:
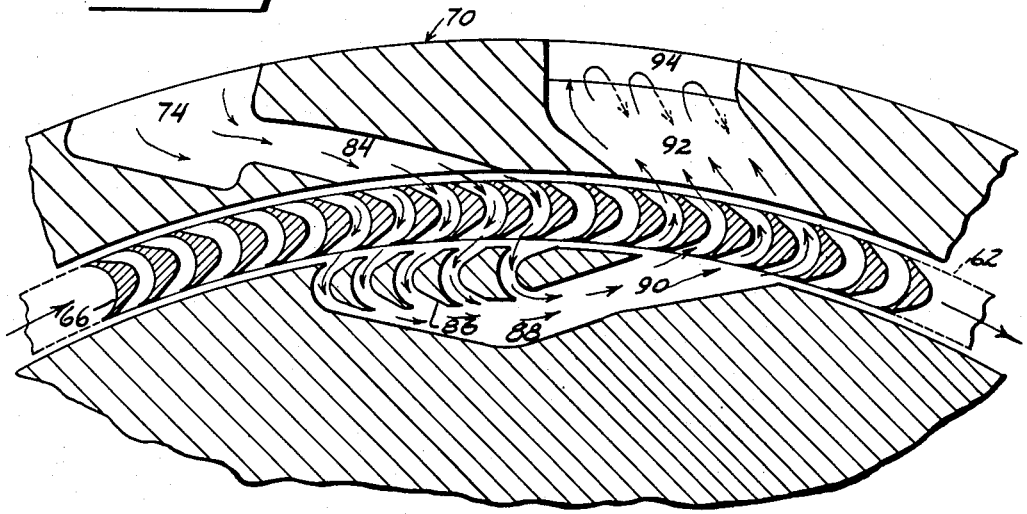
Fig. 4 is a fragmentary section through a portion of the steam turbine nozzles and wheels, showing the flow path of the working fluid through a portion of the system.

On the leftward end of the shaft 20, beyond the bearing 18 and seal 28, a pair of turbine wheels 62 and 64 are secured for rotation with the shaft. Both wheels are provided with buckets 66 and 68 respectively whose principal axes lie parallel to the shaft 20, the buckets of the high pressure wheel 62 being relatively short and the buckets of the low pressure wheel 64 being relatively long, better to utilize the working fluid as it expands in its passage through the turbines and nozzle arrangements to be described. Profile of the turbine buckets is shown in Fig. 4. Fitted in the leftward end of the housing 10 is the nozzle assembly 70 having an inner annular extension 72 secured thereto, embracing the turbine wheel hubs and comprising, with serrations in the hubs, a labyrinth at 73 to suppress flow of working fluid from one wheel cavity to the other which contain working fluid at different pressures. The nozzle assembly 70 is provided at its periphery with a segmental inlet recess 74 mating with a port 76 communicating with a chamber 78 fed, through the throttle the throttle valve 80, from an inlet steam connection 82.

Reference may now be made to Fig. 4 in conjunction with Fig. 1 for an understanding of the nozzle arrangements which cooperate with the turbine wheels 62 and 64. The cavity 74 previously mentioned delivers fluid to a converging-diverging type nozzle 84 of generally rectangular cross-section, directing fluid more or less tangentially against the buckets 66. Slight leakage between nozzles 84 and buckets 66 flows into a chamber 89 formed between the housing of the turbine and the left face as shown of the turbine wheel 62. Pressure in this chamber 89 will be less than turbine inlet pressure in the cavity 74, by the pressure drop across the nozzle 84. Pressure in the chamber 89 therefore represents an interstage pressure less than fluid inlet pressure and greater than exhaust pressure. Fluid leaving the buckets 66 after pressure-velocity loss and energy yield thereto is altered in direction by them in a well known manner, and is directed against stationary vanes 86 which again reverse the flow of fluid, delivering it into a chamber 88 connected to an outwardly directed inner nozzle 90 in the assembly 70. This nozzle directs the same working fluid, again, against the buckets 66 at a point spaced circumferentially from the nozzle 84. Thence, working fluid passes into a cavity 92 communicating with a cross-over connection 94 leading to an inwardly directed nozzle 96. This nozzle 96 is like the nozzle 84 except that it is wider, and directs the lower pressure working fluid inwardly against the buckets 68 of the turbine wheel 64. A nozzle system such as that previously described is arranged for the second wheel 64, the illustration of Fig. 4 serving to illustrate this system as well as the system for the high pressure wheel. Fluid from the nozzle 96 impinges on the buckets 68, is reversed by stationary buckets 98, passes to a passage 99 and then to an internal nozzle 100, is directed again against the buckets 68, and is exhausted into the low pressure steam chamber 16 through a passage 102.

By the simple arrangements above described, the same working fluid is caused to impinge twice on each turbine wheel and therefore imparts substantially the same energy increment to both wheels four different times. The nozzle system may be utilized singly or may be multiplied, several such nozzle systems being spaced around the periphery of the turbine wheel. In this connection, high or low power ranges may be attainable in the same unit turbine assembly.

The chamber 89 previously mentioned is formed between the turbine wheel 62 and a cover housing 104 secured to the left end of the housing 10 and operates at an intermediate pressure represented by inlet pressure less pressure drop through the nozzle 84. This housing carries the governor assembly 54 and the throttle valve 80.

Reference may now be made to Fig. 2 which shows the structural detail of the upper portion of the governor assembly. Pressure lubricant from the pump 42 in Fig. 1 is led to the upper part of the governor housing and enters the port 52. From this port, a passage 106 leads to a bell 107 on the top of the governor, fluid pressure in the bell being proportional to turbine R. P. M. A bellows 108 is contained within the bell, being sealed at its lower end to the governor housing and at its upper end to a disk 110. The disk 110 is pressed upwardly by a spring 112 to counteract the fluid pressure tending to press the disk downwardly. An adjustable speeder spring 114 between the disk 110 and the top of the bell 107, and lighter than the spring 112, serves to calibrate the governor for a desired speed. The interior of the diaphragm 108 is under oil reservoir pressure, substantially atmospheric, by its connection through a passage 116 to an outlet port 118 connected through a line 120 to an oil reservoir port 122.

The disk 110 carries a button 124 which presses upon a valve 126 vertically slidable in a seat sleeve 128, the latter having a port 130 connected to the pressure port 52, and a port 132 connected to the reservoir port 118. The sleeve 128 further contains ports 134 and 136 respectively connected through drillings in the housing to the upper and lower ends of a servo cylinder 136. Lands 138 and 140 on the valve stem 126 serve to connect the pressure port 130 to either cylinder port 134 or 136, and simultaneously to connect the ports 136 or 134 to the atmospheric port 118, accordingly as the position of the valve stem 126 is high or low in the sleeve 128. The position of the valve stem 126 is adjusted in response to speed errors caused by departure of pressure in the fluid in the governor bell 107 from a condition which balances the combined force of the springs 112 and 114.

The valve stem 126 is of novel construction in that the lands 138 and 140 are an easy fit in the valve sleeve, the stem 126 being piloted in the sleeve by more closely fitted bearing points 142 and 144 formed on the ends of the valve stem, relief being provided between these bearing points to allow free passage of lubricant past them. This construction allows the stem 126 to move freely in the sleeve without the cocking tendencies which might exist if the lands 138 and 140 were depended upon to pilot the valve stem.

Referring now to Figs. 1 and 2, the servo cylinder 136 contains a piston 146, vertically movable, and carrying a rod 148 which extends through the bottom of the cylinder 136 at which point it is sealed, to an attachment 150 with the throttle valve 80. The throttle valve is provided with a serrated throttling portion 152 to provide fluid admission to the turbine on a graded basis according to the vertical position of the throttle valve 80. The valve 80 is provided with ports 154 so that the working fluid at a pressure corresponding to the pressure downstream of the throttle valve, acts upon both sides of the valve to avoid reaction on the servo motor comprised by the piston 146 and the cylinder 136.

To avoid hunting and instability characteristics of the simple type of governor a spring bias, as a function of throttle opening, is imposed upon the valve stem 126 through the medium of a spring 156 and a dashpot thimble 158 disposed in the hollow upper portion of the piston rod 148. The thimble 158 acts to raise the valve stem 126 through a slidable pin 162, the thimble 158 also being provided with a small orifice 160 to slow down the reaction of the thimble 158 relative to the piston 146 when the latter tends to move sharply on account of speed errors in the turbine.

The spring 156 is quite light and as the position of the main throttle valve 80 changes from full open to closed, full load to no load, the force of the spring 156 is added to that of the main governor spring 112 and varies the net force due to differences in compression of the spring 156 between full open and closed throttle positions. This variation is purposely made small so as to result in a governed speed change (no load to full load) of the order of 1 to 1½% of the governed speed. Ordinarily, speed control in devices of this type is 6 to 10% of governed speed which is undesirable for many applications but is necessary to avoid speed hunting when sudden changes of load or working fluid pressure upset the equilibrium of the system. In the present governor, hunting is suppressed by the action of the thimble 158 in its bore, which acts as a dashpot since fluid pressure beneath the dashpot can change only slowly by leakage through the port 160. Slow changes of position of the servo piston 146 will not bring the dashpot into action but if the piston 146 tends to move quickly, the dashpot moves with it and in so doing resets the valve stem 126 to compensate and suppress the fast change. This construction gives the effect of a droop type governor for drastic changes in load or working fluid pressure but the droop effect is not significant when slow changes in working fluid pressure or in load occur.

Figure 3:
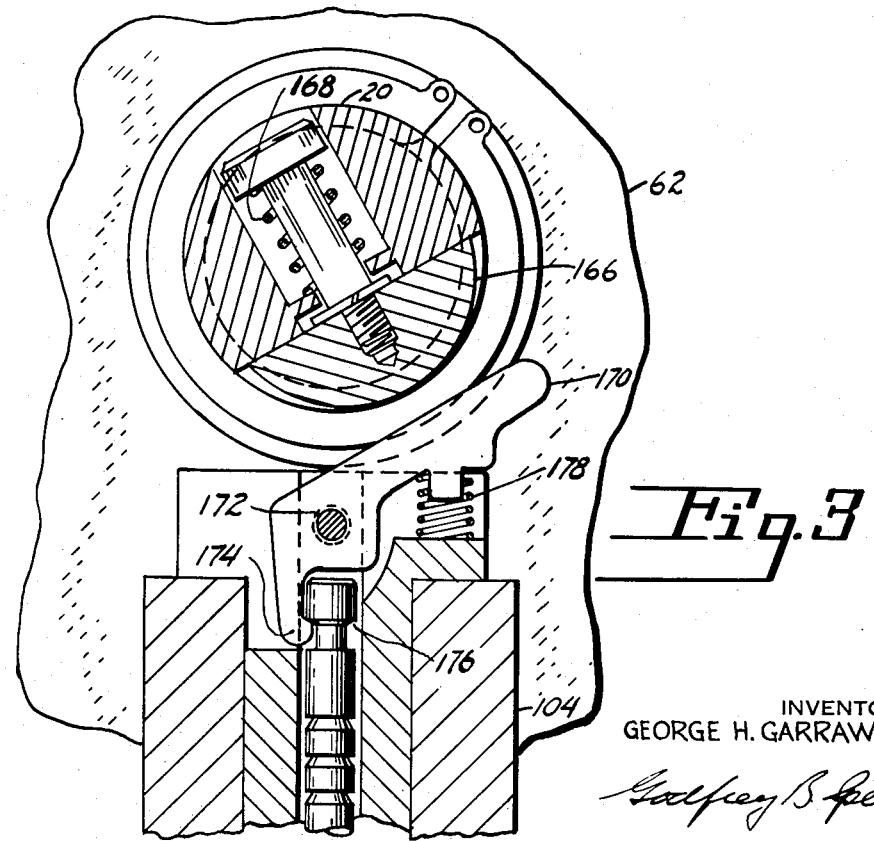
Fig. 3 is a fragmentary end view, partly in section, of an overspeed control also shown in Fig. 1.

Reference may now be made to Fig. 3 in conjunction with Fig. 1 which shows the overspeed shutoff mechanism forming a part of the invention. At the left hand end of the main shaft 20 is a flyweight 166 recessed in a slot in the shaft and normally held thereagainst by a preloaded spring 168. Should an overspeed occur, the weight 166 will move radially outwardly, overcoming the spring 168. Upon such movement the weight 166 will strike a trip lever 170 pivoted at 172 in the governor housing and will release, through a pawl 174 formed thereon, a valve stem 176. The lever 170 is normally held in the valve stem engaging position through a light spring 178. The valve stem 176 is normally spring pressed downwardly by a spring 180 and when released, drops so that a flange 182 thereon engages a valve seat 184, closing communication between the chamber 89 of the turbine assembly as at 186, and the bottom of the governor housing as at 188. This, as will be described, causes a shutdown of the turbine. When the cause of the overspeeding difficulty has been removed, the lower end of the valve stem 176, which protrudes as at 190 externally of the housing, may be pressed upwardly to reset the overspeed control, permitting free communication between the passages 186 and 188.

The lower end of the governor housing is provided with a closed-end sleeve 192 secured thereto, the upper end of the sleeve forming a valve seat. To this valve seat is fitted a movable member 194, normally pressed upwardly by a spring 196. If the spring is free to act, the member 194 is pressed upwardly around the throttle valve 80 and serves as an auxiliary shutoff, closing off the flow of working fluid from the inlet 82 to the turbine. A restricted bleed 198 is formed from the inlet port 82, in the member 194, to the cavity therebelow. During normal operation, when the overspeed valve 182 is open, a small amount of working fluid escapes therethrough to the intermediate pressure chamber 89, at a faster rate than the working fluid enters the port 198. Working fluid pressure acts upon the top of the member 194 and particularly on the upper outer rim of the member to hold it downwardly against the pressure of the spring 196, thus opening the working fluid entry to the turbine for control by the normal throttle 80. Should the overspeed valve 182 close, escape of working fluid from the bottom of the chamber 192 is stopped so that a pressure balance builds up between the upper and lower sides of the member 194. Thereupon, the spring 196 forces the member 194 upwardly to close off the flow of working fluid to the turbine regardless of the position of the normal throttle 80.

Upon reset of the stem 190, working fluid will be bled from beneath the member 194 and working fluid pressure will force the member 194 downwardly to allow resumption of normal governed operation of the turbine provided the overspeed cause was merely transient or has been corrected. It will be noted that the member 194 is larger in diameter than the throttle 80, and that its upper rim is always exposed to steam entering the inlet 82. Working fluid pressure acting upon this rim will produce a sufficient force to drive the member 194 downwardly against the spring 196 when the space below the member 194 is bled to a low pressure zone. With the member 194 in the downward position, working fluid is available to the throttle 80 to operate the turbine. Fits of the member 194 in the housing 192, and of the throttle 80 in the member 194 and in the governor housing are close and allow free relative movement without significant leakage of the working fluid.

Turbines of the type herein disclosed are adapted for operation at 1 H. P. to 40 H. P., speeds of about 3000 R. P. M., and working fluid pressures of about 125 pounds per square inch (P. S. I.) with a back pressure of about 10 P. S. I. These characteristics, however, are not limiting. It will be noted that the right hand face of the housing 10, at 24, may serve as a direct mounting for a mechanism to be driven. The turbine unit is further arranged to minimize pressure differentials across seals. In this connection, high oil pressure at about 30 P. S. I. acts on one side of seal while exhaust steam pressure acts on the other side. Gradually reducing steam pressures oppose one another in the turbine itself, minimizing leakage losses through turbine fits and labyrinths.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. In a fluid turbine governor system, said turbine including a motive fluid entry conduit, a housing including a throttle valve chamber, a piston type throttle reciprocable in said chamber and operable in different positions to admit different amounts of fluid to said turbine motive fluid entry conduit, a cylinder coaxial with said throttle, isolated from said throttle chamber, a piston reciprocable within said cylinder, means connecting said piston to said throttle to cause movement of the latter in response to movements of the former, a reciprocable control valve coaxial with the piston and spaced from one end thereof, governor means connected to said valve to establish its position in accordance with turbine speed, a source of hydraulic medium controlled by said governor and controlling said valve, said valve according to its position controlling admission and discharge of hydraulic medium to and from said cylinder above and below said piston, said piston having a central bore closed at one end and open at its other end adjacent said valve, elastic means in said bore acting between said piston and valve, coaxial with both, to exert a force on said valve as a function of piston position, said elastic means including a thimble on one end thereof and urged into valve contact thereby, said thimble being slidable in said bore and forming therewith a dashpot, said dashpot allowing only slow movement of said thimble relative to said piston upon rapid movements of said piston in said cylinder whereby the elastic force on said valve is altered, transiently, upon rapid movements of said throttle and piston.

2. In a fluid turbine governor system, said turbine including a motive fluid entry conduit, a housing including a throttle valve chamber, a piston type throttle reciprocable in said chamber and operable in different positions to admit different amounts of fluid to said turbine motive fluid entry conduit, a cylinder coaxial with said throttle, isolated from said throttle chamber, a piston reciprocable within said cylinder, means connecting said piston to said throttle to cause movement of the latter in response to movements of the former, a reciprocable control valve coaxial with the piston and spaced from one end thereof, governor means connected to said valve to establish its position in accordance with turbine speed, a source of hydraulic medium controlled by said governor and controlling said valve, said valve according to its position controlling admission and discharge of hydraulic medium to and from said cylinder above and below said piston, a sleeve in said throttle chamber coaxial with the throttle and having a closed end remote from the throttle, embracing said throttle and movable between a position closing said fluid entry conduit and a position opening said entry conduit for throttle control thereof, said throttle having an opening therein, longitudinally thereof, to balance fluid pressure at opposite ends thereof and to impose said balanced fluid pressure on the throttle end of said sleeve, whereby said fluid pressure urges said sleeve to a fluid entry conduit opening position, resilient means between said housing and sleeve, urging said sleeve to a fluid entry conduit closing position, a restricted bleed between the throttle end and the opposite end of said sleeve to bleed pressure fluid to the opposite end of said sleeve, a shut-off valve in said housing, normally open and bleeding the fluid at the opposite end of said sleeve to a low pressure zone, and means connected with and responsive to overspeed of said turbine to close said shut-off valve, whereby the pressure on opposite ends of said sleeve becomes balanced by passage of fluid through said restricted bleed and whereby said sleeve resilient means urges said sleeve to a fluid-entry conduit closing position.

3. In a fluid turbine, a housing having two tandem chambers defined by housing end walls and a housing intermediate wall, a shaft borne in one end wall and in the intermediate wall, passing through one chamber and extending into the other chamber, a turbine wheel on said shaft disposed in said other chamber, means in the wall of said other chamber for directing operating fluid to and from said turbine, the means including governing and throttling means for the incoming operating fluid, a bearing and seal means for the shaft on the intermediate wall, the seal means being on the side of said bearing adjacent said other chamber, said one chamber comprising a reservoir for lubricant, a centrifugal pump impeller on said shaft in said one chamber including a pump housing, means disposed centrally of said one chamber and adjacent said shaft to admit oil from said one chamber to the eye of the pump impeller, means freely connecting the pump housing adjacent the rim of said impeller to said seal, on the one chamber side thereof, whereby oil under pressure is imposed on said seal at all times during operation to prevent the passage of working fluid from said other chamber to said one chamber, and means connecting the pump housing, adjacent the rim of said impeller, to said governor and throttling means.

4. In a fluid turbine, a housing having two tandem chambers defined by housing end walls and a housing intermediate wall, a shaft borne in one end wall and in the intermediate wall, passing through one chamber and extending into the other chamber, a turbine wheel on said shaft disposed in said other chamber, means in the wall of said other chamber for directing operating fluid to and from said turbine, the means including governing and throttling means for the incoming operating fluid, a bearing and seal means for the shaft on the intermediate wall, the seal means being on the side of said bearing adjacent said other chamber, said one chamber comprising a reservoir for lubricant, a centrifugal pump impeller on said shaft in said one chamber including a pump housing, means disposed centrally of said one chamber and adjacent said shaft to admit oil from said one chamber to the eye of the pump impeller, means freely connecting the pump housing adjacent the rim of said impeller to said seal, on the one chamber side thereof, whereby oil under pressure is imposed on said seal at all times during operation to prevent the passage of working fluid from said other chamber to said one chamber, and means connecting the pump housing, adjacent the rim of said impeller, to said governer and throttling means, said pressurized oil on said seal passing through the intermediate wall bearing back to a point adjacent the impeller eye for lubrication of said bearing.

References Cited in the file of this patent
UNITED STATES PATENTS

| | | |
|---|---|---|
| 808,094 | Kolb | Dec. 26, 1905 |
| 962,044 | Parsons et al. | June 21, 1910 |
| 1,469,707 | Wait | Oct. 2, 1923 |
| 1,687,109 | Schmidt | Oct. 9, 1928 |
| 1,729,458 | Schwender | Sept. 24, 1929 |
| 1,897,061 | Lapp et al. | Feb. 14, 1933 |
| 1,990,872 | Lacy | Feb. 12, 1935 |
| 2,020,847 | Mitereff | Nov. 12, 1935 |
| 2,124,395 | Caughey | July 19, 1938 |
| 2,224,321 | Schwender | Dec. 10, 1940 |
| 2,345,297 | Schwender | Mar. 28, 1944 |
| 2,378,558 | Kalin | June 19, 1945 |
| 2,440,980 | Sheppard | May 4, 1948 |
| 2,462,580 | Watson | Feb. 22, 1949 |